Nov. 25, 1969  R. F. WUERKER ET AL  3,480,831

ELECTRONIC IGNITION CIRCUIT FOR FLASH LAMPS

Filed May 22, 1967

Robert A. Briones
Ralph F. Wuerker
INVENTORS

BY *Edward Dugas*
AGENT

United States Patent Office
3,480,831
Patented Nov. 25, 1969

3,480,831
ELECTRONIC IGNITION CIRCUIT FOR FLASH LAMPS
Ralph F. Wuerker, Palos Verdes Estates, and Robert A. Briones, Granada Hills, Calif., assignors to TRW Inc., Redondo Beach, Calif., a corporation of Ohio
Filed May 22, 1967, Ser. No. 639,988
Int. Cl. H05b 41/14
U.S. Cl. 315—241          9 Claims

ABSTRACT OF THE DISCLOSURE

A high-voltage capacitor bank discharge circuit is described which enables one to ignite a water-immersed xenon flash lamp within a grounded housing. The circuit is comprised of an energy storage capacitor which is connected by means of a control rectifier to a low-resistance charging circuit for charging and to a resonating discharge circuit for igniting the flash lamp.

BACKGROUND OF THE INVENTION

This invention relates generally to flash lamps and more particularly to an improved circuit for repeatedly igniting water-immersed flash lamps.

Electronic flash lamps used in flash photography and as solid state laser pumps are generally operated by connecting the lamp directly to the energy storage capacitor bank. The lamp is then fired by a damped high voltage frequency pulse applied to a wire or plate-type trigger electrode which is placed in close proximity to the envelope of the lamp. These types of circuits suffer from the disadvantage of having the high voltage from the capacitor bank always appearing across the terminals of the flash lamp. Another disadvantage is that the lamp and trigger electrode must be operated in air or other gas so as not to short or ground the trigger electrode. Heat transfer then becomes a problem and the firing rate of the lamp is limited to the amount of heat that may be transferred to the air. This particular problem becomes serious when a solid state laser rod is placed within the flash lamp for pumping. Air cooling of a laser rod and lamp is slow and not uniform. Many photographic applications and laser applications require flash lamp operation at firing levels and rates in excess of those which can be handled by an air-cooled circuit. It would therefore be desirable to have an ignition circuit which allows the flash lamp to be immersed in a cooling fluid for dissipation of heat.

SUMMARY OF THE INVENTION

In a preferred embodiment of the invention, a storage capacitor is charged by a power source through a low resistance charging circuit. A control rectifier, upon being triggered, effectively disconnects the storage capacitor from the power source connecting it across a resonating discharge circuit which is connected to the flash lamp, thereby igniting the flash lamp.

Accordingly, it is a primary object of the present invention to provide an improved circuit device for igniting flash lamps.

It is a further object of the present invention to provide an igniting circuit for a flash lamp wherein the energy storage device does not have its potential continuously applied across the terminals of the flash lamp.

It is a further object of the present invention to provide an ignition circuit for a flash lamp that may be immersed in a liquid such as water.

The foregoing and other objects and features of the present invention will be more apparent and better understood when taken in conjunction with the following description and accompanying drawings, throughout which like characters indicate like parts, and which drawings form a part of this application.

DESCRIPTION OF THE PREFERRED EMBODIMENT

Figure 1:
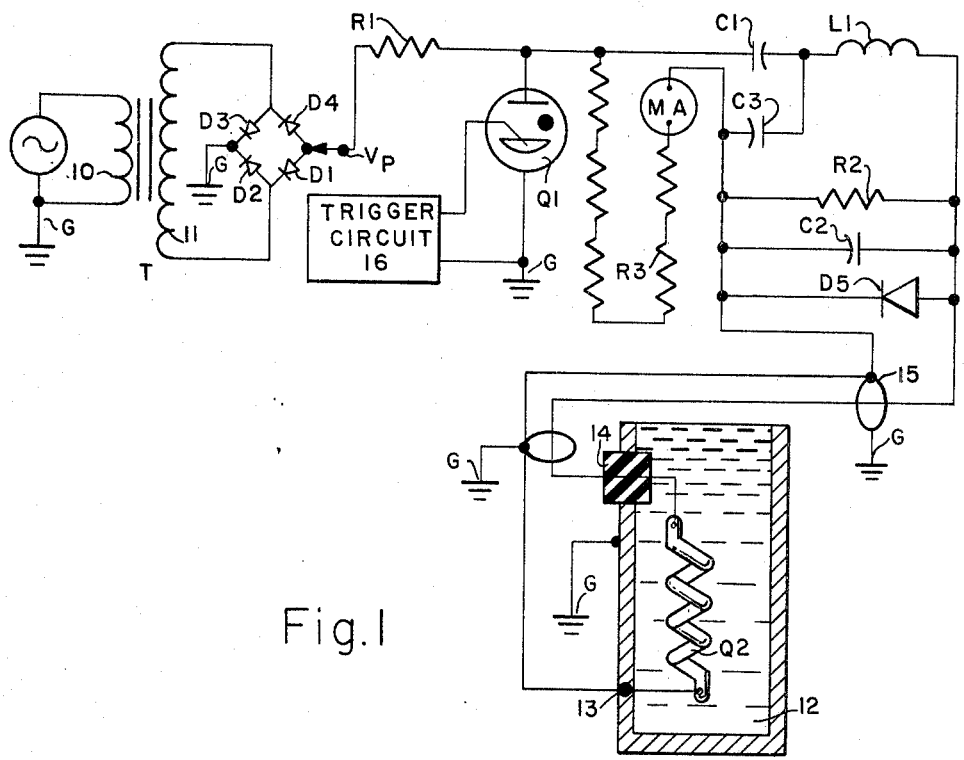
FIGURE 1 is a schematic diagram of the preferred embodiment of the present drawing.

Referring now to FIGURE 1, the power source for the flash lamp igniter is comprised of a step-up transformer T, having a primary winding 10 and a secondary winding 11, with a full wave rectifying bridge circuit comprised of rectifiers $D_1$, $D_2$, $D_3$ and $D_4$, connected across the secondary winding 11. A current limiting resistor $R_1$ is connected between the output of the bridge rectifier and the high-voltage terminal of the control rectifier ($Q_1$).

The energy storage capacitor $C_1$ is connected between the current limiting resistor $R_1$ and an air core inductor $L_1$. The air core inductor is connected to a reference terminal G (ground), by means of a charging diode, $D_5$, and parallel bleeder resistor $R_2$.

The energy storage capacitor $C_1$ is charged through diode $D_5$. When fully charged, the potential across the bleeder resistor $R_2$ is zero. Connected across resistor $R_2$ and diode $D_5$ by means of a co-axial cable 15 is the flash lamp $Q_2$. A doubling capacitor $C_2$ is connected in parallel with resistor $R_2$. A ringing capacitor , $C_3$, is connected between the junction of charging capacitor $C_1$ and inductor $L_1$ and the reference terminal G. A control rectifier $Q_1$, which may be an ignitron, thyratron or other such similar type apparatus, is connected from the junction of resistor $R_1$ and the charging capacitor $C_1$ to the reference terminal G. For the case shown, $Q_1$ is an ignitron having a trigger circuit 16 connected between the igniter of the ignitron and the reference terminal G.

With the ignitron triggered on, the junction point of the resistor $R_1$ and the storage capacitor $C_1$ is effectively placed at ground. The capacitor $C_2$ resonately charges through the inductor $L_1$ toward twice the voltage originally across $C_1$, thereby overvoltaging the terminals of the flash lamp and causing conduction to take place. If the lamp is removed from the circuit, then on firing the ignitron, $C_2$ resonately charges to twice the voltage across $C_1$ and remains at that value due to the inability of the control rectifier to carry current in the reverse direction.

The flash lamp $Q_2$ may be immersed in a high dielectric constant liquid such as water within a metallic tank connected (for maximum safety) to the reference terminal G via the coaxial shield. As noted above, one terminal of the lamp is connected to the center conductor of the coaxial cable while the other is connected to the conducting walls of the tank and then to the return coaxial shield.

In operation, the energy storage capacitor $C_1$ is charged through the resistors $R_1$ and the diode $D_5$. The latter element is placed in parallel with resistors $R_2$ to bypass it, thereby quickening the charging rate of $C_1$ and also clamping the output terminal of the capacitor $C_1$ to ground during the charging cycle. The resistor $R_2$ is primarily a bleeder resistor which drains off excess charge on capacitors $C_2$ and $C_3$, returning their potential to ground after each firing of the energy storage bank. This is particularly important in the case of misfires, after which the capacitors would remain at twice the voltage across the lamp (i.e., $2V_b$) if the resistor had been removed, thereby making it impossible to fire the system. The resistor $R_2$ is, in addition, in the bleeder chain $R_3$ of the milliammeter $M_1$, which serves to measure the voltage across the energy storage capacitor $C_1$. The two resistive values, $R_2$ and $R_3$, are chosen so that meter reads full scale when the energy storage capacitor $C_1$ is charged to its maximum voltage. Making $R_2 < R_3$ insures that the terminals of the milliammeter are essentially at ground potential both during the charging and discharging of the energy storage capacitor; that is to say, the meter terminals and movement are never at high electrical potential relative to the reference point G. With $Q_1$ triggered on, the circuit is effectively underdamped and wants to oscillate at a frequency of $$\simeq \frac{1}{2\pi\sqrt{C_2 L_1}}$$

because $C_1$ is much greater than $C_2$. The voltage across the capacitor $C_2$ builds up initially along one-half a sine curve from zero volts to approximately $2V_b$ (where $V_b$ is the voltage across the energy storage capacitor $C_1$ at the time the ignitron is fired). The lamp is over-voltaged by the charging of the capacitor $C_2$ through the inductor $L_1$. The capacitor $C_2$ also has the second feature that its charging current keeps the ignitron conducting until the gas in the lamp $Q_2$ has also become conducting.

The inductor $L_1$, in addition to doubling the voltage across $C_2$, is also important as a current limiting element; for example, in case of accidental discharge or fault, the maximum current which can be drawn from the bank $C_1$ is $$\frac{V_B}{\sqrt{L_1/C_1}}$$

where $V_B$ is the voltage of the charging circuit. The value of $L_1$ is chosen by first, the duration of the flash lamp discharged desired and second, by the degree of protection desired for the capacitor bank circuit.

In the embodiment shown in FIGURE 1, the following circuit values were used:

$R_1 = 5K$ charging resistor
$C_1 = 360$ μf. energy storage capacitor
$L_1 = 300$ μh. current limiting and resonating inductor
$C_2 = 0.1$ μf. doubling capacitor
$R_2 = 10K$ charging resistor and bank return
$C_3 = 0.1$ μf. ringing capacitor
$V_p = 0-5$ kv.
$D_5 =$ high voltage silicon rectifier (unitrode UHV-10)
$Q_1 =$ high voltage ignitron (GE 5550)
$Q_2 =$ helical xenon flash lamp (TRW-model)

Figure 2:
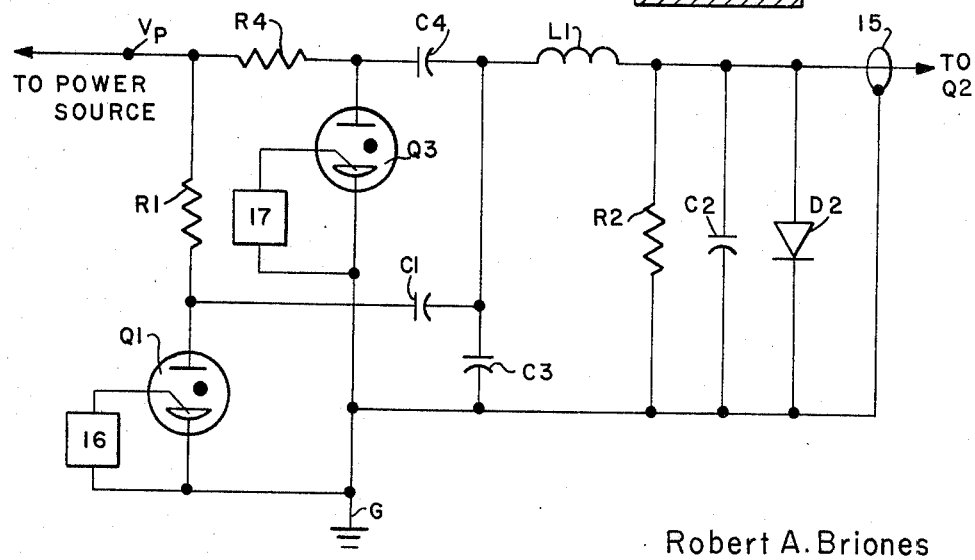
FIGURE 2 is a schematic diagram of a second embodiment of the present invention.

FIGURE 2 is a second embodiment of the invention wherein a second energy storage circuit is connected in parallel to provide sequential igniting and increased firing rates of the flash lamp. Although only two energy storage circuits are shown, it will be apparent to those persons skilled in the art that a plurality of charging circuits may be added to further increase the firing rate of the flash lamp.

A second energy storage capacitor $C_4$ is connected to the junction of inductor $L_1$ and capacitor $C_1$. A current limiting resistor $R_4$ connects the junction points of diodes $D_1$ and $D_4$ to the end of capacitor $C_4$ that is not connected to the junction of inductor $L_1$ and capacitor $C_1$. A control rectifier $Q_3$, shown as an ignition, is connected from the junction of capacitor $C_4$ and resistor $R_3$ to the reference terminal G. A triggering circuit 17 is connected between the igniter of the second ignitron $Q_3$ and the reference terminal G. This triggering circuit may be identical to triggering circuit 16.

The operation of this circuit is similar to the circuit of FIGURE 1. Either trigger circuit 16 or 17 may be energized first, discharging its respective storage capacitor. After the first energy storage capacitor has been discharged and its ignitron returns to the nonconducting state, the other storage capacitor may be discharged by its respective triggering circuit, thereby effectively doubling the firing rate of the lamp. By this technique, it has been possible to fire a high-energy xenon flash lamp repetitively within several milliseconds.

To reiterate the advantage of the present invention, the voltage across the flash lamp is zero until the ignitron is fired; subsidiary lamp triggering and keep-alive circuits are eliminated; interconnection between lamp and energy storage circuit is via single shielded cable, and lamp life may be increased by immersion in water.

While there has been shown what are considered to be the preferred embodiments of the invention, it will be manifest that many changes and modifications may be made therein without departing from the essential spirit of the invention. It is intended, therefore, in the annexed claims, to cover all such changes and modifications as fall within the true scope of the invention.

What is claimed is:

1. An electronic circuit for igniting a flash lamp comprising:
   (a) a direct-current, high-voltage source having a high voltage output terminal and a reference terminal;
   (b) a charge storage capacitor, an inductor and a diode connected serially between said high voltage terminal and said reference terminal, said diode being poled to provide a charging path for said capacitor therethrough;
   (c) a flash lamp connected between said inductor and said reference terminal, whereby said flash lamp is at substantially zero potential while said storage capacitor is being charged; and
   (d) means for suddenly and rapidly discharging said storage capacitor, said means being connected between the junction point of said charge storage capacitor and said high voltage terminal on the one hand and said reference terminal on the other hand.

2. An electronic circuit as defined in claim 1 wherein said means for discharging said storage capacitor includes a controlled rectifier and a trigger circuit for triggering it.

3. An electronic circuit as defined in claim 1 wherein a voltage doubling capacitor is connected between the junction point of said inductor and said flash lamp and said reference terminal.

4. An electronic circuit as defined in claim 1 wherein a ringing capacitor is connected across said inductor and diode to provide an oscillatory circuit with said inductor.

5. An electronic circuit as defined in claim 1 wherein an additional charge storage capacitor and controlled rectifier are connected between the junction of said first-named storage capacitor and said inductor.

6. An electronic circuit as defined in claim 1 wherein said flash lamp is immersed in a cooling liquid.

7. An electronic circuit for triggering a flash lamp without imposing a high voltage thereon unless it is triggered, said circuit comprising:
   (a) a direct current charging circuit having a high-voltage terminal and a reference terminal;
   (b) a charge storage capacitor;
   (c) a diode;
   (d) an inductor, said capacitor, inductor and diode being serially connected between said high-voltage and reference terminals, said diode being poled to permit charging said capacitor and for maintaining, during charging, the junction between said capacitor and inductor at said reference potential;
   (e) a flash lamp connected across said diode; and
   (f) electronic means for providing at will a low impedance discharge path for said capacitor, said electronic means being connected between said terminals, thereby to trigger said flash lamp.

8. An electronic circuit as defined in claim 7 wherein a voltage doubling capacitor is connected across said diode and a ringing capacitor is connected between the junction of said inductor, said capacitor and said reference terminal.

9. An electronic circuit as defined in claim 7 wherein a trigger circuit is provided for triggering said electronic means to discharge said capacitor.

References Cited

UNITED STATES PATENTS

| | | | |
|---|---|---|---|
| 2,538,577 | 1/1951 | McCarty | 315—241 |
| 2,722,631 | 11/1955 | Bowtell | 315—243 X |
| 2,763,813 | 9/1956 | McKinney et al. | 315—241 |
| 2,935,650 | 5/1960 | Rock | 315—241 |
| 3,170,084 | 2/1965 | Retzer | 315—245 X |
| 3,234,429 | 2/1966 | Schrom | 315—187 X |
| 3,334,270 | 8/1967 | Nuckolls | 315—244 X |
| 3,353,062 | 11/1967 | Nuckolls | 315—241 |

JOHN W. HUCKERT, Primary Examiner

A. J. JAMES, Assistant Examiner

U.S. Cl. X.R.

315—193, 204, 234, 238, 243